M. S. LOGAN.
MOTOR WHEEL.
APPLICATION FILED APR. 26, 1920.
1,366,672.
Patented Jan. 25, 1921.
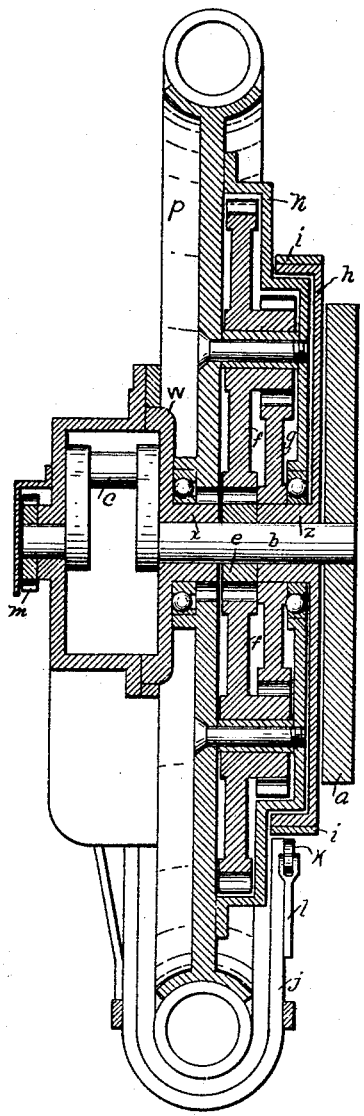
Inventor:
Maurice Samuel Logan

UNITED STATES PATENT OFFICE.

MAURICE SAMUEL LOGAN, OF LOREBURN, SASKATCHEWAN, CANADA.

MOTOR-WHEEL.

1,366,672.        Specification of Letters Patent.      Patented Jan. 25, 1921.

Application filed April 26, 1920. Serial No. 376,471.

*To all whom it may concern:*

Be it known that I, MAURICE SAMUEL LOGAN, a citizen of Canada, residing at Loreburn, in the Province of Saskatchewan and Dominion of Canada, have invented a new and useful Motor-Wheel, of which the following is a specification.

My invention relates to mechanical improvements in motor wheel construction, the objects of which are, first, to improve the motor wheel mechanically; second, to give it the added efficiency of brake control.

I attain these objects by the mechanism illustrated in the accompanying drawing, showing a horizontal cross section through the center, in which $a$ is the fly-wheel, $b$ the drive shaft, $c$ the crank, and $e$ the drive pinion which engages the gears $f$ $f$. The motor wheel is propelled by the travel of said gears $f$ $f$ around the central gear $g$ which is held stationary by the brake wheel $h$. Releasing the brake band $i$ $i$ allows said gear $g$ to rotate backward, so that no motion is imparted to the motor wheel. One end of said brake band is attached to the arm $j$ and the other end to the horizontal arm of the angle lever $k$ which is operated by the control rod $l$ attached to the other arm. The pinion $m$ drives the cam shaft and magneto (not shown). $x$ $z$ are inwardly projecting hubs on which the motor wheel turns on ball bearings.

The distinctive features of this motor wheel are: 1st, perfect balance—2nd, double durability, by reason of the double gear drive—3rd, balanced drive (lessening friction on drive shaft bearings)—4th, central drive—5th, more fly-wheel power—6th, brake control.

Aside from its use as a detachable push wheel, it may also be used, 1st, as the drive wheel in a pedalless motor bicycle (seat lowered to within easy reach of the ground with both feet)—2nd, as the third wheel in a three wheel design—3rd, two together as the drive wheels in a four wheel design. These designs would be impossible except for the brake control, which allows the motor to run idle without the wheel being lifted off the ground.

I claim:

1. A rotatably mounted gear casing provided with a road wheel rim and carrying planetary gearing, in combination with a drive pinion and a brake controlled spur gear concentric with each other and with said gear casing, and operatively meshing with said planetary gearing, substantially as shown and described.

2. The combination in a motor wheel, of a crank case with a hub attached rigidly thereto, a brake controlled element with a hub attached rigidly thereto, a road wheel mounted rotatably on said hubs, a drive shaft passing axially through said hubs, a drive pinion mounted rigidly on said shaft and between said hubs, a brake controlled spur gear concentric with said drive pinion, and planetary gearing carried by said road wheel and operatively connecting said drive pinion with said brake controlled spur gear, substantially as shown and described.

3. The combination in a motor wheel, of a rigid member provided with a hub $x$, a brake controlled member provided with a hub $z$, a gear casing mounted rotatably on said hubs and provided with a road wheel rim, a drive shaft passing axially through said hubs, a drive pinion mounted rigidly on said shaft and between said hubs, a spur gear attached rigidly to said brake controlled member and concentric with said drive pinion, and planetary gearing carried by said gear casing and operatively connecting said drive pinion with said concentric spur gear, substantially as shown and described.

4. The combination in a motor wheel, of the rigid member $w$, the hub $x$ attached to said rigid member, the brake controlled member $h$, the hub $z$ attached to said brake controlled member, the road wheel $p$ mounted rotatably on said hubs, the gear casing $n$ attached to said road wheel and concentric therewith, the drive shaft $b$ passing axially through said hubs, the drive pinion $e$ mounted rigidly on said shaft and between said hubs, the brake controlled spur gear $g$ mounted rigidly on said hub $z$ and concentric with said drive pinion, the planetary gearing $f$ carried by said road wheel and operatively connecting said drive pinion with said brake controlled spur gear, the fly wheel $a$ attached rigidly to said drive shaft, the arm *j* attached to said rigid member and extending around the rim of said road wheel, the angle lever *k* pivotally attached to said arm, and the brake band *i* passing around said brake controlled member and having one end attached to said arm and the other end attached to said angle lever, all substantially as shown and described.

MAURICE SAMUEL LOGAN.

Witnesses:
THOS. JACK,
W. A. HENDERSON.